United States Patent [19]

Gusev et al.

[11] 4,122,535

[45] Oct. 24, 1978

[54] STORAGE DEVICE

[76] Inventors: Valery Fedorovich Gusev, ulitsa Karbysheva, 13a, kv. 35; Gennady Nikolaevich Ivanov, ulitsa Dekabristov, 184-a, kv. 22, both of Kazan; Vladimir Yakovlevich Kontarev, ploschad Junosti, 4, kv. 3, Moscow; Genrikh Isaevich Krengel, ulitsa Ibragimova, 45, kv. 49, Kazan; Vyacheslav Yakovlevich Kremlev, Berezovaya alleya, korpus 423, kv. 81, Moscow; Mansur Zakirovich Shagivaleev, ulitsa Karbysheva, 17, kv. 75, Kazan; Jury Ivanovich Schetinin, 103536, korpus 503, kv. 106, Moscow; Azat Usmanovich Yarmukhametov, ulitsa Adelya Kutuya, 12, kv. 23, Kazan, all of U.S.S.R.

[21] Appl. No.: 811,788

[22] Filed: Jun. 30, 1977

[30] Foreign Application Priority Data

Jul. 7, 1976 [SU] U.S.S.R. .................. 2379679

[51] Int. Cl.$^2$ .............................................. G06F 9/20
[52] U.S. Cl. .................................................. 364/900
[58] Field of Search ... 364/200 MS File, 900 MS File

[56] References Cited

U.S. PATENT DOCUMENTS

| 3,766,527 | 10/1973 | Briley | 364/200 |
|---|---|---|---|
| 3,900,835 | 8/1975 | Bell et al. | 364/200 |
| 4,011,547 | 3/1977 | Kimmel et al. | 364/900 |

*Primary Examiner*—Harvey E. Springborn
*Attorney, Agent, or Firm*—Lackenbach, Lilling & Siegel

[57] ABSTRACT

The proposed storage device comprises a memory unit for storing control information connected to a constant register, to which there is connected a functional return address jump register, a next address register, an address digit modification attribute register, and an analysis code register, to which there is connected an analysis signal forming decoder. To the outputs of the analysis signal forming decoder there are connected main coincidence circuits which form a matrix having columns in a number equal to that of the address digits of the memory unit for storing control information being modified, and lines in a number determined by the digit capacity of the analysis code register. The proposed storage device further includes additional coincidence circuits whose number is equal to that of the address digits of the memory unit for storing control information being modified, each of said additional coincidence circuits being connected to the main coincidence circuits and the address digit modification attribute register; priority commutators for commutating modifiable address digits of the memory unit for storing control information, and priority commutators for commutating non-modifiable address digits of the memory unit for storing control information the number of the respective priority commutators is equal to that of the modifiable and non-modifiable address digits, respectively, of the memory unit for storing control information. Each of the commutators is connected to an instruction unit, a coder, the memory unit for storing control information, the functional return address jump register, and the next address register.

The priority commutators for commutating modifiable address digits of the memory unit for storing control information are also connected to the address digit modification attribute register and to each of the additional coincidence circuits.

6 Claims, 4 Drawing Figures

STORAGE DEVICE

FIELD OF THE INVENTION

The present invention relates to computers and, more specifically, to storage devices.

The invention can be used to advantage to control computer channels and processors; it is also applicable to automatic control systems for different purposes.

BACKGROUND OF THE INVENTION

There is known a storage device (cf. S. Hassoni, Microprogrammnoye upravleniye (Microprogram Control), Series II Moscow, 1974, pp.127-129), comprising a memory unit for storing control information, to whose output there is connected a constant register connected to a functional return address jump register; a next address register electrically coupled to the memory unit for storing control information; an analysis code register connected to an analysis signal forming decoder; an instruction unit whose output is electrically coupled to the memory unit for storing control information; and main coincidence circuits electrically coupled to the analysis signal forming decoder and the memory unit for storing control information. The number of analysis code registers is equal to the number of address digits being modified of the memory unit for storing control information, and the number of analysis signal forming decoders is equal to that of the analysis code registers.

The necessity of having an individual analysis code register for each modifying address digit of the memory unit for storing control information limits the number of modifiable address digits, since an increase in their number leads to an increase in the number of analysis code registers. This dependence and the limitation it entails affect the relationship between the digit capacity of the analysis code registers and that of the memory unit for storing control information, which means that they reduce the storage capacity of the memory unit to be used to control an object.

Besides, in the device under review, the checking of each condition of forming modifiable address digits of the memory unit for storing control information is carried out by a separate signal arriving from the analysis signal forming decoders, which accounts for a great number of connections and poor reliability of the device.

Furthermore, in the known device under review, the branching is oriented towards the realization of specific microprograms, and each analysis of conditions affecting address modification of the memory unit for storing control information is related to specific situations which occur in the course of executing said microprograms; as a result, the branching means and, consequently, the storage device itself cannot be used for a different system of instructions.

SUMMARY OF THE INVENTION

It is an object of the present invention to reduce the storage capacity of the memory unit for storing control information.

It is another object of the invention to provide a storage device which would make it possible to realize any system of instructions without any modifications in said storage device.

It is still another object of the invention to improve the structural regularity of the storage device and reduce the number of connections in said storage device.

The foregoing objects are attained by providing a storage device comprising a memory unit for storing control information to whose output there is connected a constant register connected to a functional return address jump register; a next address register electrically coupled to the memory unit for storing control information; an analysis code register connected to an analysis signal forming decoder; an instruction unit whose output is electrically coupled to the memory unit for storing control information; and main coincidence circuits electrically coupled to the analysis signal forming decoder and the memory unit for storing control information. The main coincidence circuits form, in accordance with the invention, a matrix having columns in a number equal to that of the modifiable address digits of the memory unit for storing control information, and lines whose number is determined by the digit capacity of the analysis code register. The storage device further including a coder; and additional coincidence circuits in a number equal to that of modifiable the address digits of the memory unit for storing control information, one of the inputs of each of said additional coincidence circuits being electrically coupled to the main coincidence circuits; an address digit modification attribute register connected to the memory unit for storing control information, which there are connected other inputs of the additional coincidence circuits, and priority commutators for commutating, respectively, modifiable and non-modifiable address digits of the memory unit for storing control information, the number of such commutators being equal to that of the modifiable and non-modifiable address digits, respectively, of the memory unit for storing control information, corresponding information inputs of each of said priority commutators being connected to the instruction unit, the functional return address jump register, the next address register, and the coder, respectively, another information input and a control input of each priority commutator for commutating modifiable address digits of the memory unit for storing control information being connected to outputs of the additional coincidence circuits and the address digit modification attribute register, respectively, corresponding control inputs of each of the priority commutators unit for storing control information still other outputs of the coder and the instruction unit, respectively, the outputs of the commutators being connected via an address bus to the memory unit for storing control information.

It is preferable that the main coincidence circuits in each line of the matrix should have a combined input connected to a respective output of the analysis signal forming decoder, and the main coincidence circuits in each column of the matrix should have a combined output connected to another input of each additional coincidence circuit.

It is also preferable that each of the priority commutators for commutating modifiable and non-modifiable address digits, respectively, of the memory unit for storing control information should include a priority circuit having coincidence circuits, whose number is equal to that of the conditions affecting the address formation of the memory unit for storing control information minus one; and NOT circuits in a number equal to that of the coincidence circuits, each NOT circuit being connected to respective coincidence circuits; AND circuits, the input of one of the AND circuits being combined with the input of one of the NOT circuits, which is the control input of the respective priority commutator, the other AND circuits, whose number is equal to that of the coincidence circuits, being connected to respective coincidence circuits; and an OR circuit whose inputs are connected to the AND circuits and whose output is connected to the memory unit for storing control information.

The present invention makes it possible to modify address digits of the memory unit for storing control information in a uniform manner irrespective of specific conditions being checked.

In addition, while analyzing the functions performed by individual circuits of the storage device, the invention ensures a required number of branching directions by producing a respective code in the modification attribute register.

BRIEF DESCRIPTION OF THE DRAWINGS

Other objects and advantages of the present invention will become more apparent from the following detailed description of a preferred embodiment thereof to be read in conjunction with the accompanying drawings, wherein.

DETAILED DESCRIPTION OF THE INVENTION

The storage device of the present invention will be described with reference to its use in a microprogram control computer.

The proposed device comprises a memory unit 1 for storing control information, to which there are connected an address bus 2, priority commutators 3 for commutating modifiable address digits of the memory unit 1, and priority commutators 4 for commutating non-modifiable address digits of the memory unit 1. The number of the priority commutators 3 and 4 is equal to that of the modifiable and non-modifiable address digits, respectively, of the memory unit 1. To the memory unit 1 there are connected a constant register 5, a next address register 6, an address digit modification attribute register 7, and an analysis code register 8. A first output 9 of the register 5 is a first output of the proposed storage device, a second output of the register 5 is connected to a functional return address jump register 10. A first output 11 of the register 8 is a second output of the proposed storage device, a second output of the register 8 is connected to an analysis signal forming decoder 12.

Figure 1:
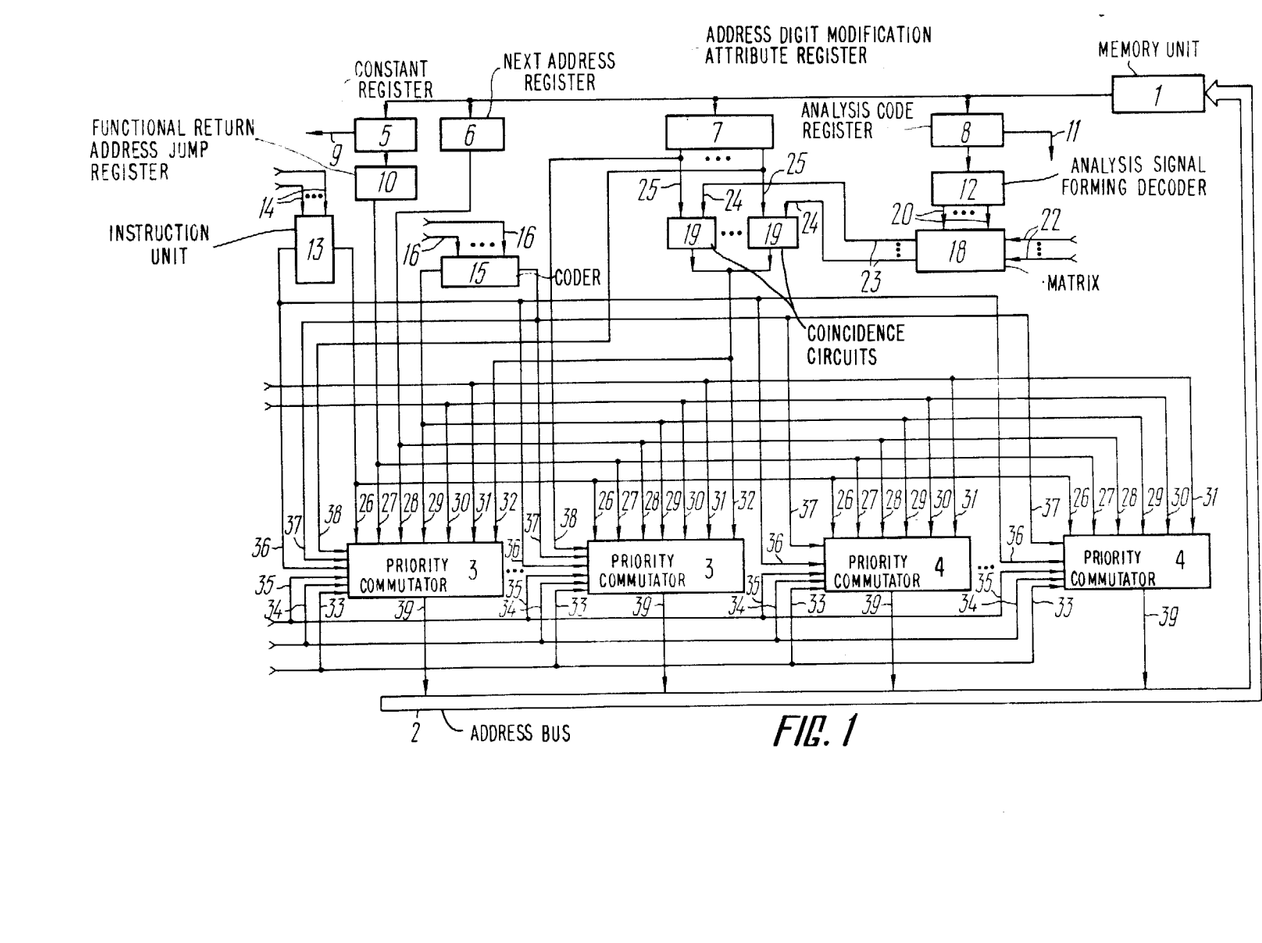
FIG. 1 is a block diagram of a storage device in accodance with the invention.

The storage device of this invention further includes an instruction unit 13 whose inputs 14 are connected to a first set of inputs of the proposed storage device; a coder 15 whose inputs 16 are connected to a second set of inputs of the proposed storage device; main coincidence circuits 17 (FIG. 2) which are combined into a matrix 18 (FIGS. 1 and 2); and additional coincidence circuits 19 (FIG. 1). The matrix 18 (FIG. 2) has columns in a number equal to that of the modifiable address digits of the memory unit 1 (FIG. 1) and lines whose number is determined by the digit capacity of the register 8. In each line of the matrix 18 (FIGS. 1 and 2), first inputs 21 of each of the coincidence circuits 17 are combined to form an input 20. The inputs 20 (FIG. 1) are connected to respective outputs of the decoder 12. Other inputs 22 (FIGS. 1 and 2) of each of the circuits 17 (FIG. 2) are connected to respective inputs of a third set of inputs of the proposed storage device. In each column of the matrix 18 (FIGS. 1 and 2), outputs of each of the circuits 17 are combined and form an output 23, each of the outputs 23 being connected to a first input 24 (FIG. 1) of a respective additional coincidence circuit 19. A second input 25 of each additional coincidence circuit 19 is connected to a respective output of the register 9. Information inputs 26, 27, 28 and 29 of each of the priority commutators 3 and 4 are connected to a first output of the unit 13, an output of the register 10, an output of the register 6 and a first outpout of the coder 15, respectively; information inputs 30 and 31 are connected to a fourth set of inputs of the proposed storage device. An information input 32 of each commutator 3 is connected to the output of the respective additional coincidence circuit 19. Control inputs 33, 34 and 35 of each of the commutators 3 and 4 are connected to a fifth set of inputs of the proposed storage device, and control inputs 36 and 37 are connected to a second output of the unit 13 and a second output of the coder 15, respectively. A control input 38 of each commutator 3 is connected to a respective output of the register 7. Outputs 39 of all the commutators 3 and 4 are connected to the address bus 2.

Each of the priority commutators 4 for commutating nonmodifiable address digits of the memory unit 1 for storing control information comprises a priority circuit 40 (FIG. 3) which contains coincidence circuits 41, 42, 43, 44 and 45 and NOT circuits 46, 47, 48, 49 and 50. The output of the NOT circuit 46 is connected to first inputs of the coincidence circuits 41, 42, 43, 44 and 45. The output of the circuit 47 is connected to second inputs of the circuits 42, 43, 44 and 45. The output of the circuit 48 is connected to third inputs of the coincidence circuits 43, 44 and 45. The output of the circuit 49 is connected to fourth inputs of the coincidence circuits 44 and 45. The output of the circuit 50 is connected to a fifth input of the coincidence circuit 45. Second, third, fourth and fifth inputs of the circuits 41, 42, 43 and 44, respectively, are combined with inputs of the NOT circuits 47, 48, 49 and 50, respectively, and are connected to the control inputs 34, 37, 35 and 36 (FIG. 1), respectively the priority commutator 4 (FIGS. 1 and 3) further includes AND circuits 51, 52, 53, 54, 55 and 56 (FIG. 3), the outputs of which being connected to an input of an OR circuit 57 whose output is connected to the output 39 (FIG. 1) of the priority commutator 4. The inputs of the AND circuits 51, 52, 53, 54 and 55 (FIG. 3) are connected to outputs of the coincidence circuits 45, 44, 43, 42 and 41, respectively. A first input of the AND circuit 56 is connected to the input of the NOT circuit 46, which is the control input 33 (FIG. 1) of the priority commutator 4. Second inputs of the AND circuits 51, 52, 53, 54, 55 and 56 (FIG. 3) are connected to the information inputs 28, 26, 27, 29, 31 and 30 (FIG. 1) of the priority commutator 4, respectively.

Figure 4:
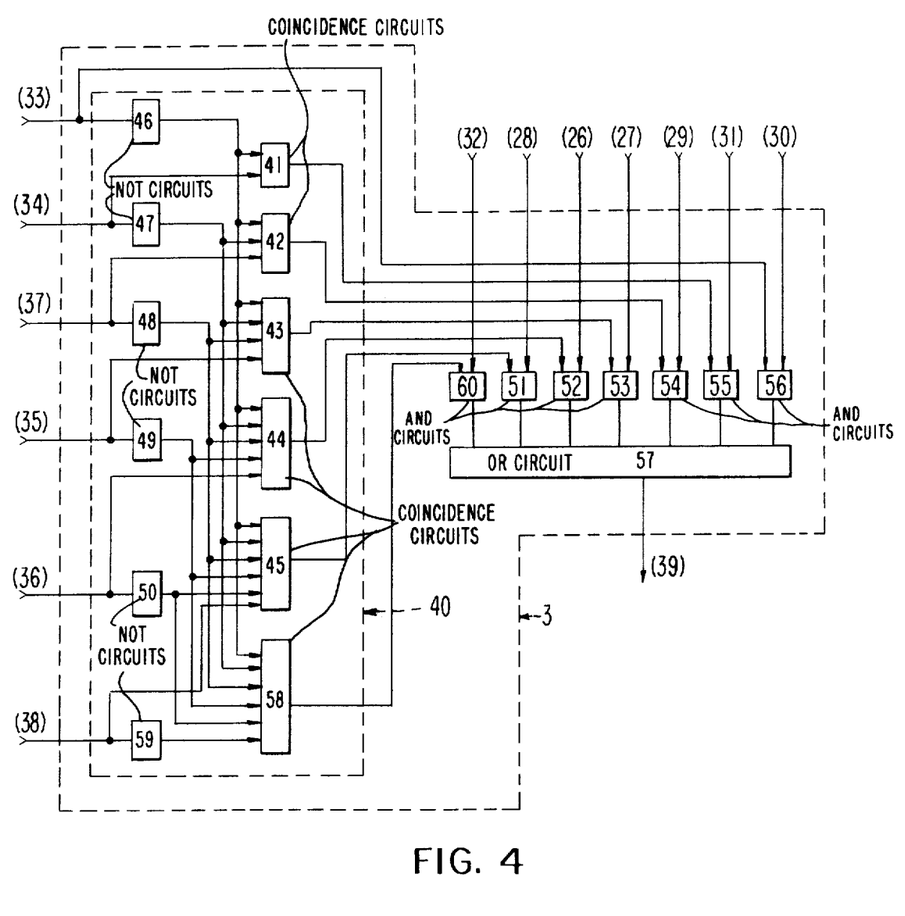
FIG. 4 is a block diagram of a priority commutator for commutating modifiable address digits of the memory unit for storing control information, in accordance with the invention.

Each of the priority commutators 3 for commutating modifiable address digits of the memory unit 1 for storing control information is similar to the priority commutator 4 (see FIG. 4) with the exception that the commutators 3 include one more coincidence circuit 58, one more NOT circuit 59 whose input is connected to the control input 38 of said commutator 3, and one more AND circuit 60, one of whose inputs is the information input 32 of said commutator 3.

The proposed storage device operates as follows.

The execution of each data processing operation, initiated in the form of an instruction, takes a certain number of time steps, therefore, from the memory unit 1 (FIG. 1) for storing control information it is necessary to select a respective number of control words arranged in a predetermined sequence. From the memory unit 1, control information is applied to the constant register 5, the next address register 6, the address digit modification attribute register 7, and the analysis code register 8. From the register 6, the address of the next control word of the memory unit 1 is applied to the information inputs 28 of the priority commutators 3 and 4 for commutating modifiable and non-modifiable address digits, respectively, of the memory unit 1. If there are not signals at the control inputs 33, 34, 35, 36 and 37 of the priority commutators 3 and 4, and at the control input 38 of the priority commutators 3, the address code is applied via the commutators 3 and 4 to the address bus 2, thus determining the address of the next control word of the unit 1. Thus control information is selected from the unit 1 to realize an arbitrarily selected algorithm in the case when the address of the next control word is contained in the previous control word.

The initial address of a sequence of control words can be indicated from several directions. As a key is pressed down on the control panel (not shown), a signal is applied to the coder 15 via the input 16. The coder 15 produces an address of the beginning of the control word sequence (control words are referred to hereinafter as microinstructions and a sequence of microinstructions is referred to as a microprogram). This address is applied to the information inputs 29 of the respective priority commutators 3 and 4. At the same time the coder 15 produces a control signal to go with the address information, which is applied to the control input 37 of the priority commutators 3 and 4. If there are no control signals at the inputs 33 and 34 of the commutators 3 and 4, the input 37 possesses the top priority, and from the coder 15 the address is applied via the commutators 3 and 4 to the address bus 2, thus determining the address of the next control word of the memory unit 1. If the device is executing instructions of a required system of instructions, the initial address of a microprogram, which realizes the algorithm of the execution of a given instruction, determines the instruction code. In the course of operation, the instruction code is applied to the input 14 of the instruction unit 13 and stored by said unit 13. Following the execution of a previous instruction, the unit 13 produces a control signal which is applied to the control input 36 of each of the commutators 3 and 4; in the absence of higher-priority control signals, information is applied from the unit 13 to the address bus 2 and is the next address of the unit 1. Numerically, this information may correspond to the instruction code. A sequence of control words is read out from the unit 1; this information determines the operation required to execute a given instruction.

The sequence of reading out control words can be changed; this may take place, for instance, when it is necessary to discontinue the execution of an instruction.

Whenever it is necessary to discontinue the normal microprogram routine in cases of all kinds of program errors, such as memory protection failures, calls to nonexistent addresses, attemps to execute instructions outside the system of instructions, etc., a signal to discontinue the execution of instructions is applied to the input 16 of the coder 15. Depending on the type of interruption, the coder 15 produces an address which determines the start of a microprogram pertaining to a given situation and the passage of other addresses through the commutators 3 and 4 is blocked.

If it is necessary to call a control word of the memory unit 1 manually from the control panel, the address of this word is applied to the information input 30 of the commutators 3 and 4. Simultaneously, to the control input 33 of said commutators 3 and 4 there is applied a signal to enable the address transmission from the control panel. Thus the necessary control word is read out from the memory unit 1.

The information input 31 of the commutators 3 and 4 and the respective control input 34 serve for peripheral control of the storage device, for example, with the aid of another storage device (not shown). For troubleshooting purposes, the other storage device applies the control words' addresses of the memory unit 1 to the inputs 31 of the commutators 3 and 4; this information is used to actuate some or other circuits of an object under control.

A sequence of control words of the memory unit 1 may be a microprogram common to the execution algorithms of several instructions, which is further referred to as a subprogram, to which a number of microprograms have access. The point of entry to a given subprogram is determined by its starting address and can be indicated in the microprogram, i.e. can be contained in the next address register. In each particular case, the return address is different and determined by the type of microprogram. Hence, the return address must be indicated before the entry to the subprogram. The return is effected as follows. A certain return address code is applied before the entry into the subprogram to the functional return jump register 10 from the constant register 5 whose output 9 is one of the outputs of the proposed storage device. In its last microinstruction, each subprogram contains an order to receive the code address from the register 10, which is applied to the control input 35 of the commutators 3 and 4. From the register 10, the return address code is applied via the commutators 3 and 4 and the bus 2 to the input of the memory unit 1 to continue the program. The address from the functional return jump register 10 can be used jointly with the branching described in greater detail below.

In the course of executing a sequence of microinstructions there may arise the necessity of branching depending on whether the conditions checked by the device are or are not complied with. The branching may take two, four, eigth, etc. directions. In each particular case a certain set of conditions is checked. Although the number of such checks is quite large and the conditions are diverse, a set of conditions checked at a time is limited.

Figure 2:
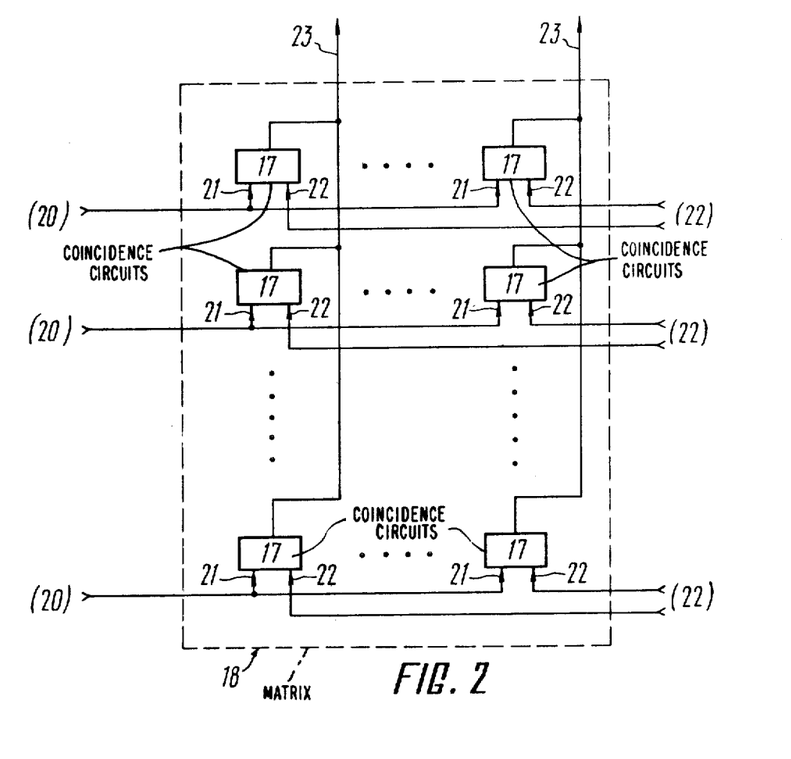
FIG. 2 is a block diagram of a matrix formed by the main coincidence circuits, in accordance with the invention.

While branching is effected, the storage device of this invention operates as follows. From the register 6, nonmodifiable digits of the next address code are applied to the inputs 28 of the commutators 4. The serial number of the set of conditions being checked is set by the analysis code register 8 and decoded by the decoder 12. All possible conditions to be checked are applied to the inputs 22 (FIGS. 1 and 2) of the main coincidence circuits 17 (FIG. 2) which form the matrix 18 (FIGS. 1 and 2).

Each line of the matrix 18 corresponds to the serial number of a set of conditions being checked. From the decoder 12 (FIG. 1), signals are applied to the combined input 20 of the respective line of the matrix 18 (FIG. 2) to actuate the main coincidence circuits 17 (FIG. 2) of the given line; conditions to be checked are applied to the other inputs of said coincidence circuits 17. "0" or "1" are picked from the combined outputs 23 (FIGS. 1 and 2) of the coincidence circuits 17 (FIG. 2) of each column of the matrix 18, depending on whether the condition being checked is met, and are used to form a code corresponding to the state of conditions being checked at the moment of analysis. Thus at the outputs 23 of the coincidence circuits 17 there can be $2^n$ combinations, where $n$ is the number of columns of the matrix 18, which is equal to the number of modifiable address digits. To each line of the matrix 18, through the inputs 22, there are applied conditions which are analyzed simultaneously; however, a condition may be applied to the inputs 22 of the coincidence circuits 17 of several lines of the matrix 18 at once, which means that the checking of this condition is combined with the checking of other conditions. In the general case, the number of combinations of conditions being checked is as follows:

$$K = 2^n \cdot m,$$

where $m$ is the number of analysis codes.

From the outputs 23 of the coincidence circuits 17 (FIG. 2), the code is applied via the respective additional coincidence circuits 19 (FIG. 1) to the information inputs 32 of the commutators 3 and substitutes for the respective modifiable address digits, for example low-order digits, when the high-order, non-modifiable, address digits are transmitted through the commutators 4. Thus branching is effected in $2^n$ directions. In order to limit the number of branching directions, use is made of the information contained in the address digit modification attribute register 7 of the memory unit 1. The presence of "1" in some digit of the register 7 permits one of the outputs 23 of the coincidence circuits 17 (FIG. 2) to be connected via the additional coincidence circuits 19 to the information inputs 32 of the respective commutators 3. The absence of "1" in the respective digit of the register 7 (FIG. 1) blocks the reception of the code from said outputs 23 and permits the passage of the address code from the register 6 through the respective commutator 3. The presence of a single unity ("1") in the register 7 ensures branching in two directions; the presence of two unities allows branching in four directions, etc. Thus the use of a single analysis signal (the actuation of a single line of the matrix 18), in combination with the modification attribute, makes it possible to carry out ($2^n - 1$) types of checks (the zero code of the modification attribute means the absence of analysis). With m analyses, the number of checks is as follows:

$$F = m(2^n - 1).$$

The checking is provided for in a convenient way, and the storage capacity of the memory unit 1 is used sparingly.

Consider now operation of the priority commutators 4.

Figure 3:
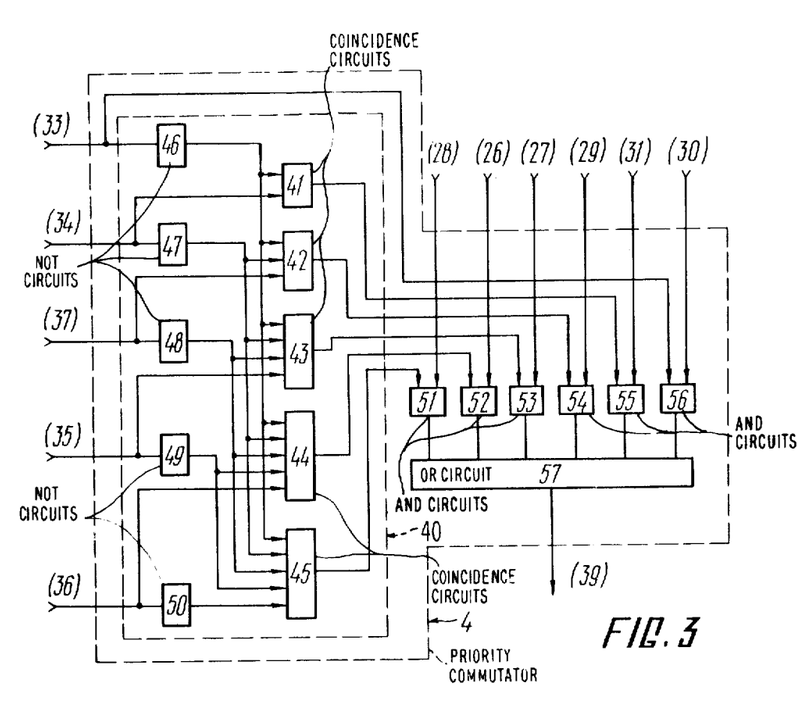
FIG. 3 is a block diagram of a priority commutator for commutating non-modifiable address digits of the memory unit for storing control information, in accordance with the invention.

Information with regard to the address of the next control word is applied to the inputs 26, 27, 28, 29, 30 and 31 of the commutators 3 and 4 (FIG. 1) and the inputs 32 of the commutators 3 from several directions simultaneously, so to the outputs 39 of said commutators 3 and 4 there must be applied only one address corresponding to the code arriving from the top-priority direction. For this purpose, the commutators 3 and 4 include the priority circuit 40 (FIG. 3).

The commutators 4 (FIGS. 1 and 3) for commutating non-modifiable address digits of the memory unit 1 (FIG. 1) operate as follows.

The address applied from the control panel is the top-priority address. The operator may interfere with the operation of the device at any time, so the control signal from the output 33 (FIG. 1) is applied to the AND circuit 56 (FIG. 3), whereby information from the control panel is passed through said AND circuit 56 of the input 30 (FIG. 1) and proceeds via the OR circuit 57 (FIG. 3) to the address bus 2 (FIG. 1) of the memory unit 1. Simultaneously, the same control signal from the input 33 (FIG. 1) is inverted by the NOT circuit 46 (FIG. 3) and applied to one of the inputs of the coincidence circuits 41, 42, 43, 44 and 45, thus blocking the passage of control signals therethrough from the inputs 34, 35, 36 and 37 (FIG. 1) of the commutators 4 (FIGS. 1 and 3) and, consequently, the arrival of the address (information) code from the respective directions to the address bus 2 (FIG. 1).

The address code from the other storage device (not shown) is applied to the input 31 (FIG. 1) and accompanied by a control signal applied via the input 34 (FIG. 1) to another input of the coincidence circuit 41 (FIG. 3), whereby the circuit 41 is actuated. In case of the absence of a control signal from the control panel at the input 33 (FIG. 1), the former control signal permits the passage of the address code from the other storage device via the AND circuit 55 (FIG. 3) and OR circuit 57 to the bus 2 (FIG. 1). Simultaneously, the same control signal from the input 34 (FIG. 1) is inverted by the NOT circuit 47 (FIG. 3) and applied to the other inputs of the coincidence circuits 42, 43, 44 and 45, blocking the passage through those circuits of control signals from the inputs 35, 36 and 37 (FIG. 1) of the commutators 4 (FIGS. 1 and 3) and, consequently, the arrival of the address code from the respective directions at the bus 2 (FIG. 1).

When the execution of a current instruction is interrupted, the address code is applied from the coder 15 (FIG. 1) to the input 29 and accompanied by a control signal applied via the input 37 of the commutator 4 to the remaining input of the coincidence circuit 42 (FIG. 3), whereby the circuit 42 is actuated. In case of the absence of control signals from the control panel or the other storage device, which are higher-priority signals, at the inputs 33 and 34 (FIG. 1), said control signal permits the passage of the address code related to the beginning of the microprogram of processing the respective interruption situation from the coder 15 via the AND circuit 54 (FIG. 3) and OR circuit 57 to the address bus 2. Simultaneously, the same control signal from the coder 15 is inverted by the NOT circuit 48 (FIG. 3) and applied to other inputs of the coincidence circuits 43, 44 and 45, there blocking the passage through said coincidence circuits 43, 44 and 45 of control signals from the inputs 35 and 36 (FIG. 1) of the commutators 4 (FIGS. 1 and 3) and, consequently, the arrival of the code address from the respective directions at the address bus 2 (FIG. 1).

When it is necessary to effect a return jump from the microsubprogram to the main microprogram, the return address code is applied from the register 10 (FIG. 1) to the input 27 and accompanied by a control signal applied via the input 35 (FIG. 1) to the remaining input of the coincidence circuit 43 (FIG. 3), whereby the circuit 43 is actuated. In case of the absence of control signals at the higher-priority inputs 33, 34 and 37 (FIG. 1) of the commutator 4, the code of the return jump to the main microprogram is allowed to pass from the register 10 via the AND circuit 53 (FIG. 3) and OR circuit 57 to the address bus 2 (FIG. 1). Simultaneously, the same control signal from the input 35 (FIG. 1) is inverted by the NOT circuit 49 (FIG. 3) and applied to other inputs of the coincidence circuits 44 and 45, thus blocking the passage through said coincidence circuits 44 and 45 of the remaining control signals of the commutator 4 (FIG. 1) and, consequently, the arrival of the address code from the respective directions at the address bus 2.

When setting the address of the beginning of a microprogram for the execution of an instruction of the system of instructions, the address code is determined by the instruction unit 13 (FIG. 1); it is applied to the input 26 of the commutators 4 and accompanied by a control signal applied via the input 36 to the remaining input of the coincidence circuit 44 (FIG. 3), whereby the circuit 44 is actuated. In case of the absence of control signals at the higher-priority inputs 33, 34, 35 and 37 (FIG. 1) of the commutator 4, it permits the passage of the code of the address that determines the start of the microprogram for the execution of the given instruction from the instruction unit 13 (FIG. 1) via the AND circuit 52 (FIG. 3) and OR circuit 57 to the address bus 2 (FIG. 1). Simultaneously, the same control signal from the unit 13 is inverted by the NOT circuit 50 (FIG. 3) and applied to the remaining input of the coincidence circuit 45, thus blocking the formation of the condition for passage of the address code to the address bus 2 (FIG. 1) from the lowest-priority direction through the input 28 of the commutator 4; only in the absence of control signals at the inputs 33, 34, 35, 36 and 37 of the commutators 4 does the coincidence circuit 45 permit the passage of the address code from the next address register 6 via the AND circuit 51 (FIG. 3) and OR circuit 57 to the address bus 2 (FIG. 1); this means that the next control word address contained in the previous control word is of the lowest priority.

The priority commutators 3 (FIG. 1) for commutating modifiable address digits of the memory unit 1 differ from the priority commutators 4 for commutating non-modifiable address digits of the memory unit 1 by in that they have one additional information input 32 and one additional control input 38.

Operation of the priority commutators 3 (FIG. 4) is similar to that of the commutators 4 described above; it must be kept in mind in this connection that the additional control signal at the inputs 38 (FIG. 4) is of the lowest priority.

The proposed storage device exhibits important advantages over the known devices of this type in that it reduces the amount of branching hardware and the storage capacity of the memory unit by reducing its digit capacity.

The functional potentialities of the proposed device are superior to those of the conventional devices, for the device of this invention makes it possible to select a control word by using different units of the device as address sources; moreover, the selection is effected in the most convenient direction.

The proposed device substantially reduces the required amount of memory addresses by selecting an optimum number of branchings for each particular situation, which means an increased effective capacity of the device.

What is claimed is:

1. A storage device using addresses having a number of modifiable address digits and a number of non-modifiable address digits comprising:

a memory unit for storing control information having an input and an output;

an address bus connected to said input of said memory unit for storing control information;

a constant register having an input connected to said output of said memory unit for storing control information, a first output connected to a first output of said storage device, and a second output;

a functional return address jump register having an input connected to said second output of said constant register, and an output;

a next address register having an input connected to said output of said memory unit for storing control information, and an output;

an address digit modification attribute register having an input connected to said output of said memory unit for storing control information, and a group of outputs;

an analysis code register having an input connected to said output of said memory unit for storing control information, a first output connected to a second output of said storage device, and a second output;

an analysis signal forming decoder having an input connected to said second output of said analysis code register, and a group of outputs;

a plurality of coincidence circuits combined into a matrix having columns equal in number to the number of modifiable address digits of said memory unit for storing control information and lines equal in number to the digit capacity of said analysis code register, each coincidence circuit of said plurality of coincidence circuits having a first input electrically coupled to a respective output of said analysis signal forming decoder, a second input, and an output;

a group of additional coincidence circuits equal in number to the number of modifiable address digits of said memory unit for storing control information, each of additional coincidence circuits having a first input connected to a respective output of said group of outputs of said address digit modification attribute register, a second input electrically coupled to said output of a respective coincidence circuit of said plurality of coincidence circuits, and an output;

priority commutators for commutating modifiable address digits of said memory unit for storing control information equal in number to the number of modifiable address digits of said memory unit for storing control information, each of said priority commutators having first, second, third, fourth, fifth, sixth and seventh information inputs, first, second, third, fourth, fifth and sixth control inputs, and an output connected to said address bus;

priority commutators for commutating non-modifiable address digits of said memory unit for storing control information equal in number to the number of non-modifiable address digits of said memory unit for storing control information, each of said commutators having first, second, third, fourth, fifth and sixth information inputs, first, second, third, fourth, and fifth control inputs, and an output connected to said address bus;

an instruction unit having a group of inputs, a first output connected to said first information input of each of said priority commutators, and a second output connected to said fourth control input of each of said priority commutators;

a coder having a group of inputs, a first output connected to said fourth information input of each of said priority commutators, and a second output connected to said fifth control input of each of said priority commutators;

said second information input of each of said priority commutators being connected to said output of said functional return address jump register;

said third information input of each of said priority commutators being connected to said output of said next address register;

said fifth and sixth information inputs and said first, second and third control inputs of each of said priority commutators, said group of inputs of said instruction unit, said group of inputs of said coder, and said second input of each coincidence circuit of said plurality of coincidence circuits being connected to respective inputs of said storage device;

said seventh information input of said priority commutators for commutating modifiable address digits of said memory unit for storing control information being connected to said outputs of said additional coincidence circuits;

said sixth control input of said priority commutators for commutating modifiable address digits of said memory unit for storing control information being connected to a respective output of said address digit modification attribute register.

2. A storage device as claimed in claim 1, wherein said first inputs of said coincidence circuits in each line of said matrix are interconnected and connected to said respective output of said group of outputs of said analysis signal forming decoder, and said outputs of said coincidence circuits in each of said columns of said matrix are interconnected and connected to said second input of a respective additional coincidence circuit.

3. A storage device as claimed in claim 2, wherein each of said priority commutators for commutating modifiable address digits of said memory unit for storing control information comprises:

a priority circuit having a group of coincidence circuits and a group of NOT circuits, said group of coincidence circuits of said priority circuit being equal in number to the number of conditions affecting address formation of said memory unit for storing control information minus one, each of said coincidence circuits having a group of inputs and an output, said group of NOT circuits of said priority circuit being equal in number to the number of said coincidence circuits of said priority circuit, each of said NOT circuits having an input connected to a respective control input of said priority commutator, and an output connected to said input of a respective coincidence circuit and to said inputs of coincidence circuits connected to control signals of a low priority than that connected to said NOT circuit;

a group of AND circuits equal in number to the number of said coincidence circuits plus one, each of said AND circuits having a first input connected to a respective information input of said priority commutator, a second input, and an output;

an OR circuit having inputs connected to said outputs of respective AND circuits, and an output connected to the output of said priority commutators;

said NOT circuit whose output is connected to said inputs of all of said coincidence circuits having its input connected to said second input of one of said AND circuits;

each of the other NOT circuits having its input connected to a respective input of a coincidence circuit connected to a control signal of a higher priority than that connected to said NOT circuit;

the other AND circuits of said group of AND circuits having said second inputs connected to said outputs of respective coincidence circuits.

4. A storage device as claimed in claim 2, wherein each of said priority commutators for commutating non-modifiable address digits of said memory unit for storing control information comprises:

a priority circuit having a group of coincidence circuits and a group of NOT circuits, said group of coincidence circuits of said priority circuit being equal in number to the number of conditions affecting address formation of said memory unit for storing control information minus one, each of said coincidence circuits having a group of inputs and an output, said group of NOT circuits of said priority circuit being equal in number to the number of said coincidence circuits of said priority circuit, each of said NOT circuits having an input connected to a respective control input of said priority commutator, and an output connected to said input of a respective coincidence circuit and to said inputs of coincidence circuits connected to control signals of a lower priority than that connected to said NOT circuit;

a group of AND circuits equal in number to the number of said coincidence circuits plus one, each of said AND circuits having a first input connected to a respective information input of said priority commutator, a second input, and an output;

an OR circuit having inputs connected to said outputs of respective AND circuits, and an output connected to the output of said priority commutator;

said NOT circuit whose output is connected to said inputs of all of said coincidence circuits having its input connected to said second input of one of said AND circuits;

each of the other NOT circuits having its input connected to a respective unit of a coincidence circuit connected to a control signal of a higher priority than that connected to said NOT circuit;

the other AND circuits of said group of AND circuits having said second inputs connected to said output of said respective coincidence circuits.

5. A storage device as claimed in claim 1, wherein each of said priority commutators for commutating modifiable address digits of said memory unit for storing control information comprises:

a priority circuit having a group of coincidence circuits and a group of NOT circuits, said group of coincidence circuits of said priority circuit being equal in number to the number of conditions affecting the address formation of said memory unit for storing additional information minus one, each of said coincidence circuits having a group of inputs and an output, said group of NOT circuits of said priority circuit being equal in number to the number of said coincidence circuits of said priority circuit, each of said NOT circuits having an input connected to a respective control input of said priority commutator, and an output connected to said input of a respective coincidence circuit and said inputs of coincidence circuits connected to control signals of a lower priority that that connected to said NOT circuit;

a group of AND circuits equal in number to the number of said coincidence circuits plus one, each AND circuit having a first input connected to a respective information input of said priority commutator, a second input, and an output;

and OR circuit having inputs connected to said outputs of respective AND circuits, and an output connected to the output of said priority commutator;

said NOT circuits whose output is connected to said inputs of all of said coincidence circuits having its input connected to said second input of one of said AND circuits;

each of the other NOT circuits having its input connected to a respective input of a coincidence circuit connected to a control signal of a higher priority than that connected to said NOT circuit;

the other AND circuits of said group of AND circuits having said second inputs connected to said outputs of respective coincidence circuits.

6. A storage device as claimed in claim 1, wherein each of said priority commutators for commutating non-modifiable address digits of said memory unit for storing control information comprises:

a priority circuit having a group of coincidence circuits and a group of NOT circuits, said group of coincidence circuits of said priority circuit being equal in number to the number of conditions affecting address formation of said memory unit for storing control information minus one, each of said coincidence circuits having a group of inputs and an output, said group of NOT circuits of said priority circuit being equal in number to the number of said coincidence circuits of said priority circuit, each of said NOT circuits having an input connected to a respective control input of said priority commutator, and an output connected to said input of a respective coincidence circuit and to said inputs of coincidence circuits connected to control signals of a lower priority than that connected to said NOT circuit;

a group of AND circuits equal in number to the number of said coincidence circuits plus one, each of said AND circuits having a first input connected to a respective information input of said priority commutator, a second input, and an output;

an OR circuit having inputs connected to said outputs of respective AND circuits, and an output connected to the output of said priority commutator;

said NOT circuit whose output is connected to said inputs of all of said coincidence circuits having its input connected to said second input of one of said AND circuits;

each of the other NOT circuits having its input connected to a respective input of a coincidence circuit connected to a control signal of a higher priority than that connected to said NOT circuit;

the other AND circuits of said group of AND circuits having said second inputs connected to said outputs of respective coincidence circuits.

* * * * *